United States Patent
Hebert

(12) 
(10) Patent No.: US 6,332,734 B1
(45) Date of Patent: Dec. 25, 2001

(54) METHOD AND APPARATUS FOR MOUNTING A SUPPLY ROLL OR RECORDING MEDIA TO A SUPPORT SHAFT IN AN IMAGING SYSTEM

(75) Inventor: Thomas K. Hebert, Groveland, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/316,569

(22) Filed: May 21, 1999

(51) Int. Cl.[7] .............................. B65H 19/29; B23B 5/22; B25G 3/20
(52) U.S. Cl. ...................... 403/371; 242/578.1; 403/372; 403/373; 403/374.3; 403/110; 403/368; 279/48; 279/136
(58) Field of Search ..................... 403/371, 373, 403/374.1, 374.4, 383, 302, 358, 370, 109.4, 109.5, 377; 242/578.1

(56) References Cited

U.S. PATENT DOCUMENTS

| | | | |
|---|---|---|---|
| 1,244,865 | * 10/1917 | Krohn | 242/578.1 |
| 1,515,382 | * 11/1924 | Cheesman | 242/578.1 |
| 2,346,846 | * 4/1944 | Isaacs | 403/370 |
| 3,003,149 | * 10/1961 | Grashow | 403/371 |
| 3,096,989 | * 7/1963 | Fallon | 403/370 |
| 3,595,592 | * 7/1971 | Wagner | 279/47 |
| 3,595,593 | * 7/1971 | Gold | 279/57 |
| 3,726,522 | * 4/1973 | Silberman | 272/84 |
| 3,781,908 | * 12/1973 | Tullos | 346/140 |
| 5,433,551 | * 7/1995 | Gordon | 403/109.5 |
| 5,474,403 | * 12/1995 | Hetrich | 403/369 |
| 5,598,739 | 2/1997 | Blake et al. | |
| 5,649,780 | * 7/1997 | Schall | 403/370 X |
| 5,927,892 | * 7/1999 | Teh-Tsung | 403/259 |
| 5,931,598 | * 8/1999 | Wang | 403/351 |
| 5,938,212 | * 8/1999 | Wadsworth | 279/42 |
| 6,076,840 | * 6/2000 | Kincaid et al. | 403/122 X |

FOREIGN PATENT DOCUMENTS

| | | | |
|---|---|---|---|
| 179220 | * 9/1917 | (CA) | 403/371 |
| 22297 | * 4/1901 | (CH) | 403/370 |
| 520133 | * 2/1931 | (DE) | 403/370 |
| 599 359 A1 | * 6/1994 | (EP) | 403/370 |
| 1143919 | * 10/1957 | (FR) | 403/370 |
| 2235610 | * 1/1975 | (FR) | 403/370 |
| 94242 | * 7/1959 | (NO) | 403/370 |

* cited by examiner

Primary Examiner—Lynne H. Browne
Assistant Examiner—Ernesto Garcia
(74) Attorney, Agent, or Firm—John A. Merecki; Robert A. Sabourin; Joseph D. King

(57) ABSTRACT

A method and apparatus for mounting a supply roll to a rotatable support shaft in an imaging system. The apparatus includes a first collet/collar assembly for accurately positioning the supply roll at a desired location on the support shaft, and a second collet/collar assembly for frictionally coupling the support shaft to an interior surface of a supply core of the supply roll using a deformable gland.

10 Claims, 8 Drawing Sheets

METHOD AND APPARATUS FOR MOUNTING A SUPPLY ROLL OR RECORDING MEDIA TO A SUPPORT SHAFT IN AN IMAGING SYSTEM

FIELD OF THE INVENTION

The present invention is in the field of imaging systems. More particularly, the present invention provides a method and apparatus for mounting a supply roll of recording media to a support shaft in an imaging system.

BACKGROUND OF THE INVENTION

In many imaging systems, such as imagesetters or platesetters, a movable optical carriage is used to displace a laser system or other imaging source in a slow scan direction along a media support surface (e.g., internal drum) to expose a supply of recording media supported on the media support surface. Generally, the imaging source includes a beam deflection assembly, comprising a deflector element (e.g., a mirror) and a spin motor for rotating the deflector element. The beam deflection assembly deflects an imaging beam generated by a radiation source across the recording media. Such an imaging system is described, for example, in U.S. Pat. No. 5,598,739, assigned to Agfa Corporation, incorporated herein by reference.

As known in the art, imaging systems are commonly equipped with internal punches that are configured to punch a predetermined set of registration openings (e.g., holes, notches, etc.), into the recording media being imaged. By registering (i.e., aligning) the recorded image to the set of holes in the recording media, accurate registration throughout the prepress process can be achieved.

The recording media to be imaged by an imaging system is commonly supplied in web form. The recording media, which may comprise a photosensitive, radiation sensitive, thermally sensitive, or other type of imageable material, is typically wound around the core of a supply roll that is mounted on a rotatable support shaft. The rotatable support shaft may comprise a portion of a media supply cassette. During the loading of the recording media onto the media support surface, a section of the web of recording media is drawn from the supply roll and is positioned on the media support surface.

Currently available systems for mounting and positioning the supply roll on a support shaft are expensive to machine and produce, have a high part count, and are difficult to use. Further, it is often difficult to accurately, repeatedly, and/or adjustably position the supply roll in a desired location on the support shaft (e.g., relative to the punches of the imaging system) using known supply roll mounting techniques.

SUMMARY OF THE INVENTION

The present invention provides a method and apparatus for accurately positioning, and easily mounting, a supply roll of recording media to a support staff in an imaging system.

Generally, the present invention provides an apparatus for mounting a supply roll to a rotatable support shaft in an imaging system which includes: a first assembly for positioning a first end of the supply roll at a predetermined location on the support shaft; and a second assembly for frictionally coupling the support shaft to an interior surface of a supply core of the supply roll.

The present invention additionally provides a method for mounting a supply roll to a rotatable support shaft in an imaging system, the method including the steps of: positioning a first end of the supply roll at a predetermined location on the support shaft; and frictionally coupling the support shaft to an interior surface of a supply core of the supply roll.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
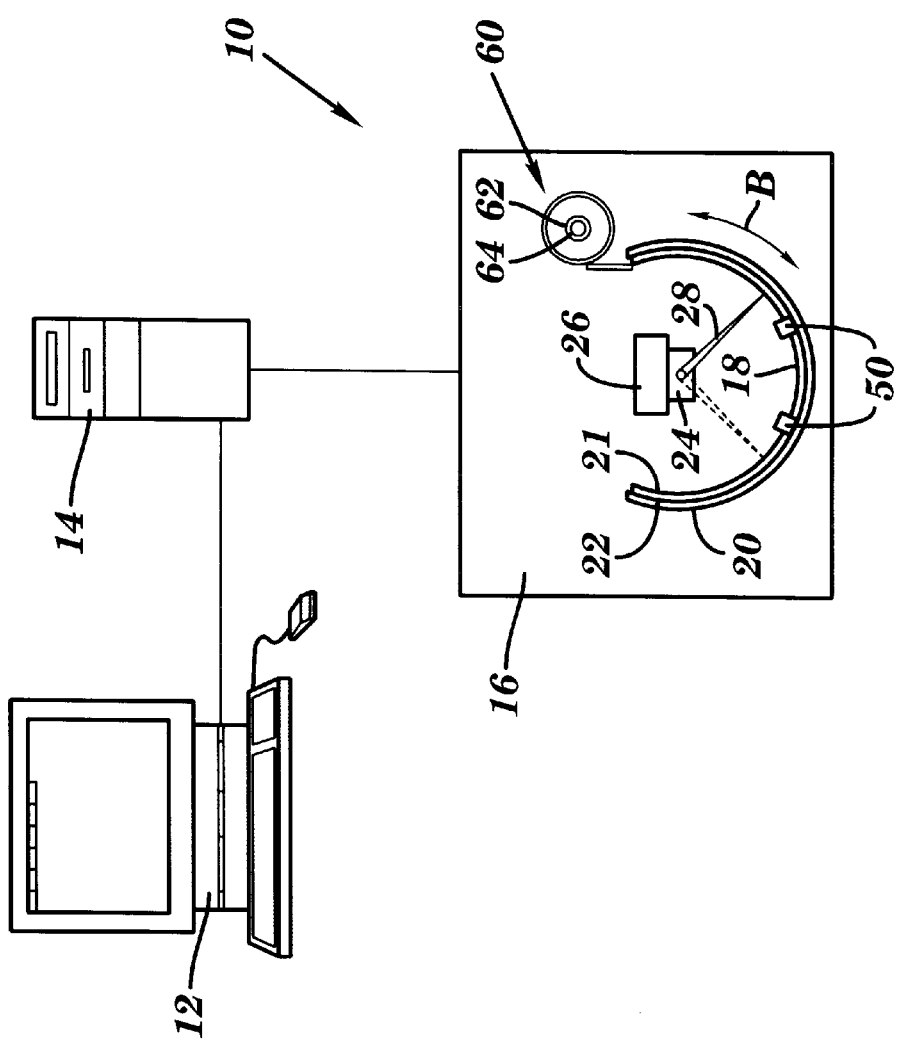
FIG. 1 illustrates an example of an imaging system for recording images onto a supply of recording media that is dispensed in web form from a supply roll.

The features and advantages of the present invention are illustrated in detail in the accompanying drawings, wherein like reference numerals refer to like elements throughout the drawings. Although the drawings are intended to illustrate the present invention, the drawings are not necessarily drawn to scale.

An example of an imaging system 10 is illustrated in FIG. 1. In this example, the imaging system 10 includes an internal drum imagesetter configured to record digital data onto a supply of film, a printing plate, or other recording media. Although described below with regard to an internal drum imagesetter, the present invention may be used in conjunction with a wide variety of other types of internal drum, external drum, or capstan type imaging systems, including platesetters and the like, without departing from the intended scope of the present invention as set forth in the claims.

The imaging system 10 generally includes a front end computer or workstation 12 for the design and layout of pages to be printed, a raster image processor (RIP) 14 for rasterizing the page data, and an imagesetter 16. The imagesetter 16 records the digital data provided by the RIP 14 onto a supply of photosensitive, radiation sensitive, thermally sensitive, or other type of suitable recording media 18. The recording media 18 is provided in web form and is dispensed from a supply roll 60. Depending upon the type of recording media, the type of imaging system, and other factors, the supply roll 60 may be contained within a media supply cassette (not shown). A core 62 of the supply roll 60 is mounted on a rotatable support shaft 64. Rotation of the support shaft 64, and the supply roll 60 mounted thereon, are preferably controlled by a motor through a friction drive system (not shown). Other systems for directly or indirectly rotating the support shaft 64 may also be utilized.

The imagesetter 16 includes an internal drum 20 having a cylindrical imaging surface 22 for supporting and positioning the recording media 18 during imaging. The imagesetter 16 further includes a scanning system 24, carried by a movable optical carriage 26, for recording digital data onto the recording media 18 using an imaging beam 28.

Figure 2:
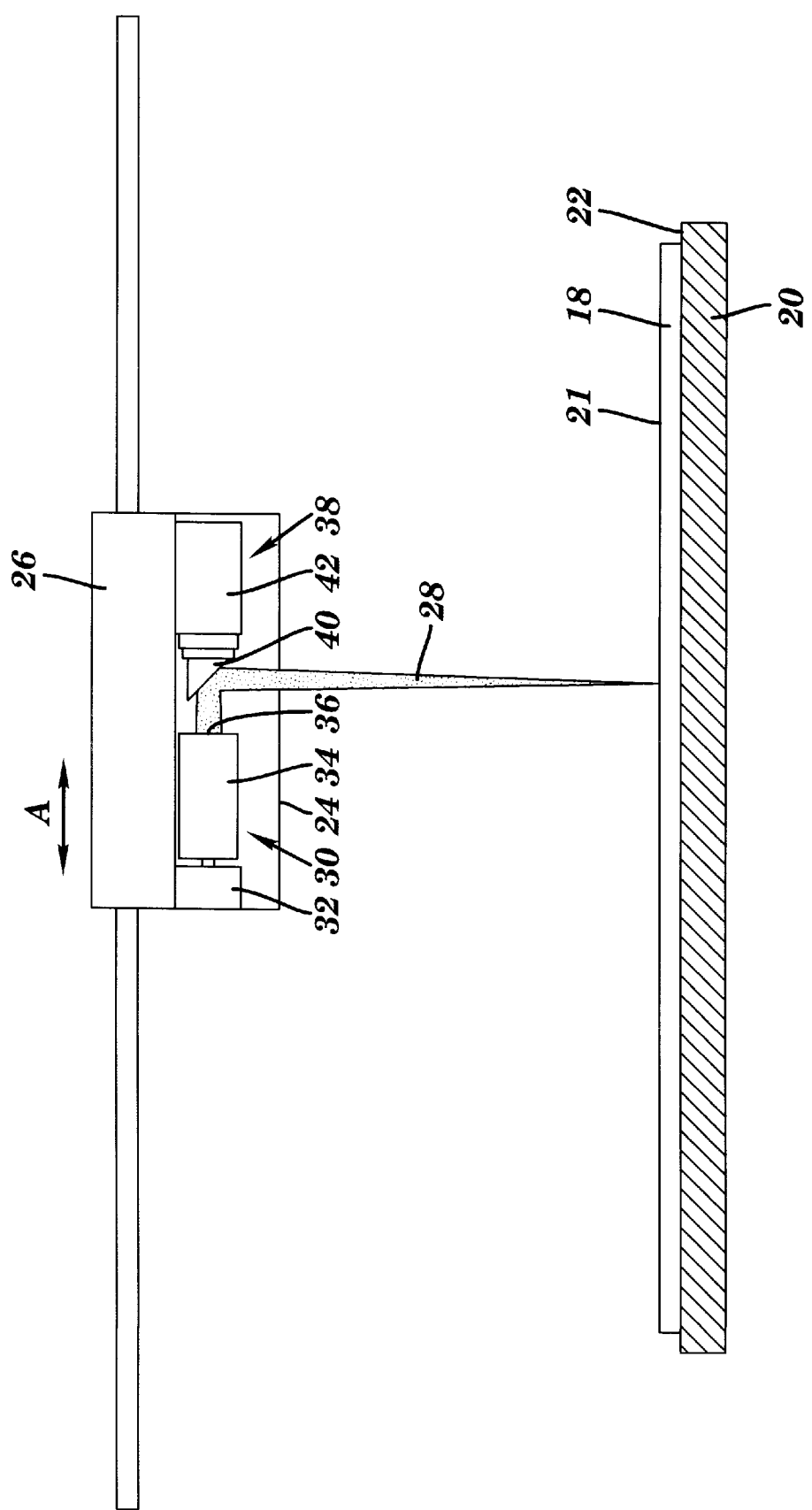
FIG. 2 illustrates the movable optical carriage and scanning system of the imaging system of FIG. 1.

As illustrated in FIG. 2, the scanning system 24 is displaced by the movable optical carriage 26 in a slow scan direction (directional arrow A) along the internal drum 20 to expose the recording media 18 in a line-wise manner. The optical carriage 26 is preferably displaced by an onboard drive system (not shown), although an external drive system may also be used.

The scanning system 24 typically includes a laser system 30 for generating the imaging beam 28. The laser system 30 comprises a light or radiation source 32 for producing the imaging beam 28, and an optical system 34 positioned between the radiation source 32 and the imaging surface 22 for focusing the imaging beam 28 onto the recording media 18. The imaging beam 28 exits the optical system 34 through a spot focusing lens 36. The scanning system 24 further includes a beam deflection assembly 38 for deflecting the imaging beam 28 across the recording media 18 in a fast scan curvilinear direction B (see FIG. 1) to record a scan line on the imaging surface 21 of the recording media 18. The beam deflection assembly 38 comprises a deflector element 40 (e.g., a mirror) and a spin motor 42 for rotating the deflector element 40. As the deflector element 40 is rotated by the spin motor 42, the imaging beam 28 is scanned across the recording media 18 as shown in FIG. 1, thereby imaging a scan line on the recording media 18. The scanning system 24 described above is only one of many different types of scanning systems that may be used to record image data on the recording media 18.

Referring again to FIG. 1, at least one side punch 50 is positioned and attached in a known manner to an end of the internal drum 20. The punches 50 are used to punch a predetermined set of registration holes, notches, etc., in the recording media 18. By aligning the image recorded by the scanning system 24 onto the recording media 18 to the set of holes in the recording media 18, accurate registration throughout the prepress process can be achieved.

In the imaging system 10, an edge of the recording media 18 must be accurately positioned within each punch 50 to ensure proper registration. This requires the accurate positioning of the supply roll 60 on the support shaft 64. Also, the positioning of the supply roll 60 must be repeatable when replacing an empty supply roll with an identical full supply roll, and must be adjustable to allow for the use of different sizes or types of supply rolls, widths of recording media, etc. The mounting apparatus of the present invention provides an easy to use system for accurately, repeatedly, and adjustably positioning a supply roll on a support shaft of an imaging system. It should be appreciated that the mounting system of the present invention can also be used to position a take-up roll for collecting the recording media 18 after imaging. Further, the mounting system of the present invention may be used in systems other than imaging systems to position a supply or take-up roll in a desired location on a support shaft.

Figure 3:
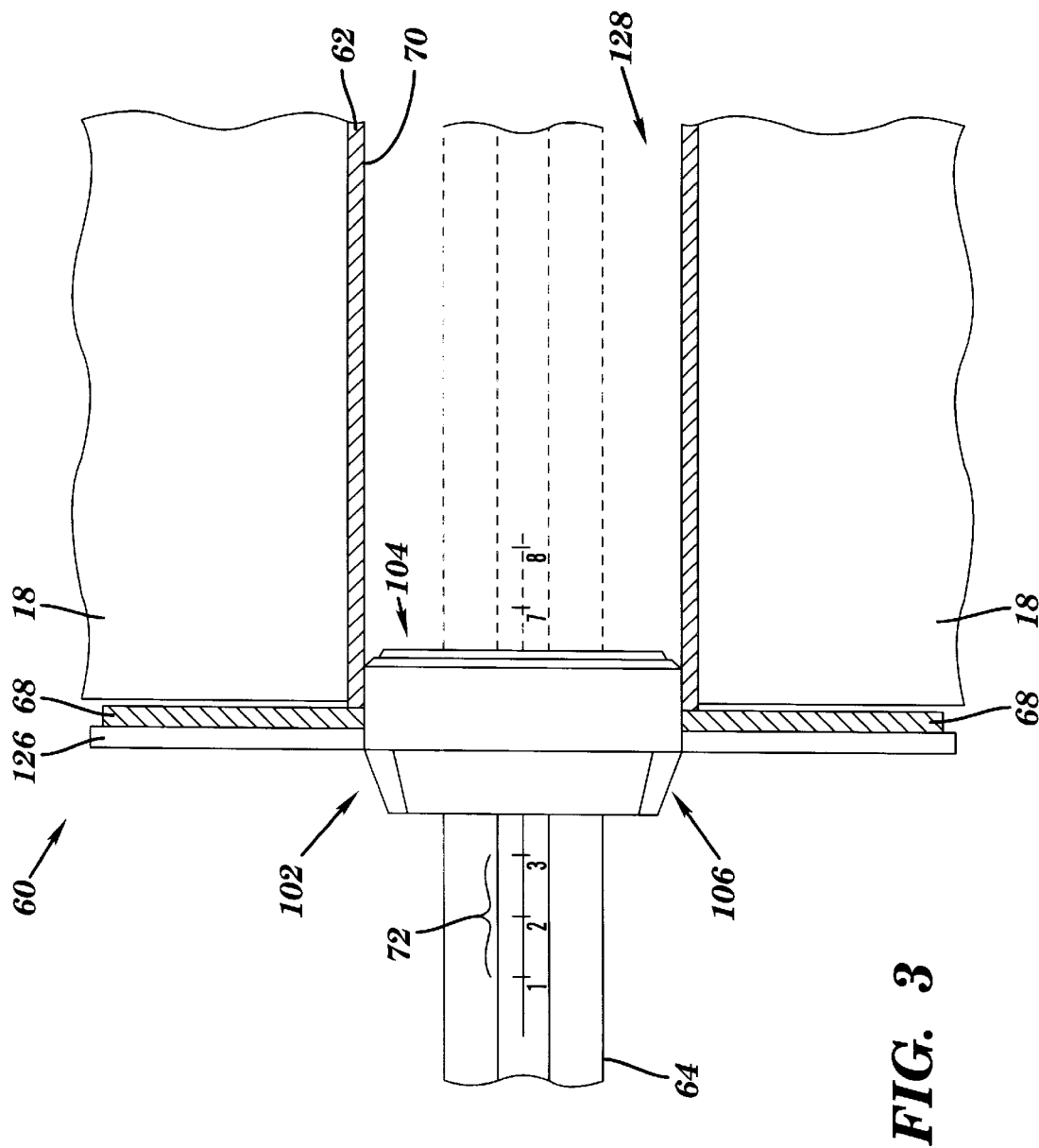
FIG. 3 illustrates a collet/collar assembly for positioning a supply roll at a desired location on a support shaft.

As illustrated in FIG. 3, the support shaft 64 includes positioning indicia 72 for facilitating the accurate placement of the supply roll 60 on the support shaft 64. The positioning indicia 72 may include a numerical scale as shown in FIG. 3, or may take on any other appropriate configuration. Once suitably positioned on the support shaft 64, the supply roll 60 is locked into position on the support shaft 64 by the mounting apparatus of the present invention.

As further illustrated in FIG. 3, the supply roll 60 includes a supply core 62 and end flanges 68 (only one of which is shown). A web of the recording media 18 is wound around the supply core 62 and is confined between the end flanges 68. As will be detailed below, the mounting apparatus of the present invention is configured to correctly position the supply roll 60 within the imaging system, and to couple the support shaft 64 to an interior surface 70 of the supply core 62. To prevent any independent relative rotation of the mounting apparatus and the support shaft 64, thereby ensuring that the mounting apparatus and support shaft 64 rotate as a single unit, the support shaft 64 is preferably formed with a hexagonal cross-section. Other polygonal or suitable cross-sections may also be used. Analogously, as described in greater detail below, the mounting apparatus of the present invention is provided with a pair of collets each including a bore having a shape corresponding to the cross-section of the support shaft 64. A collar is used to tighten each of the collets against the surface of the support shaft 64.

The components of a mounting apparatus in accordance with the present invention are illustrated in FIGS. 3–7. In a first embodiment of the present invention, a first type of collet/collar assembly 102 (FIGS. 3 and 4) is used to right or left justify a side of the supply roll 60 relative to the punches of the imaging system. The type of justification that is required depends on such factors as the structure of the imaging system, location of the punches, etc.

Figure 4:
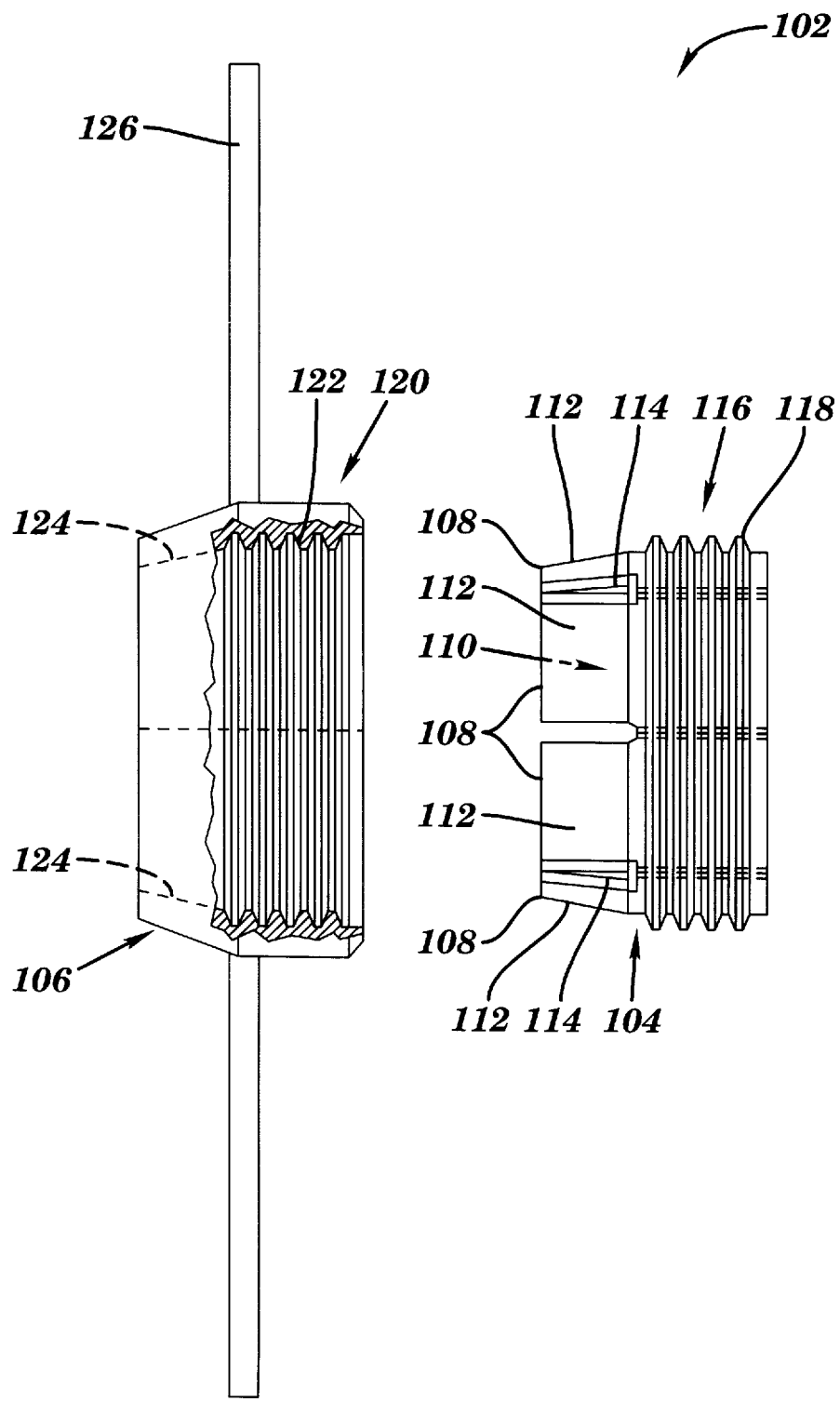
FIG. 4 is an exploded view of the collet/collar assembly illustrated in FIG. 3.

The collet/collar assembly 102 includes a collet 104 and a collar 106. The collet 104 preferably comprises a plurality of leaf springs 108 (e.g., 6 leaf springs) arranged about a hexagonal bore 110 (FIG. 4). The collet 104 may include fewer leaf springs 108 than the number of sides of the support shaft 64. However, to ensure a secure attachment of the collet 104 to the support shaft 64 upon engagement of the collar 106, the leaf springs 108 should be arranged in an opposing relationship around the bore 110. The hexagonal bore 110 is slightly larger than the hexagonal cross-section of the support shaft 64, thereby allowing the collet 104 to be repositioned along the support shaft 64. Each leaf spring 108 includes a frustroconical outer surface 112 and an inner bearing surface 114. A portion 116 of the collet 104 adjacent to, and formed integrally with, the leaf springs 108, includes an external thread 118.

The collar 106 comprises a cylindrical portion 120 having an internal thread 122. The internal thread 122 is configured to mate with the external thread 118 on the collet 104 upon rotation of the collar 106 in a first direction. The collar 106 further includes a corresponding frustroconical internal bearing surface 124. The collar 106 additionally includes a stop or locator flange 126 for positioning the end flange 68 of the supply roll 60 at a desired location along the support shaft 64. The flange 126 may include a plurality of splines (not shown) or similar structure to facilitate its operation.

When the collar 106 is screwed onto the collet 104, the frustroconical internal bearing surface 124 of the collar 106 engages the frustroconical outer surfaces 112 of the leaf springs 108 of the collet 104. The engagement of the surfaces 112, 124 compresses the inner bearing surface 114 of each leaf spring 108 against the surface of the support shaft 64, thereby securing the collet/collar assembly 102 against the support shaft 64.

In operation, the collet/collar assembly 102 is secured to the support shaft 64 as described above to position the flange 126 in a required location (as indicated by the positioning indicia 72) on the support shaft 64. The supply roll 60 may then be displaced along the support shaft 64 until the end flange 68 of the supply roll 60 engages the flange 126 (FIG. 3), thereby positioning the supply roll 60 in its required location on the supply shaft 64. As the end flange 68 approaches the flange 126, the cylindrical portion 120 of the collar 106 enters the bore 128 of the supply core 62. The portion 120 of the collar 106, when inserted into the supply core 62, serves to support and center the supply core 62 about the support shaft 64. Advantageously, the supply roll 60, and subsequent identical replacement supply rolls, can be easily, accurately, and repeatedly positioned at a required location along the support shaft 64. If a different type of recording media and/or supply roll is required, the collet/collar assembly 102 can be easily relocated as necessary to any location along the support shaft 64. The collet/collar assembly 102 is simply loosened from the support shaft 64 by rotating the collar 106 in a direction opposite the first direction until the leaf springs 108 no longer tightly engage the support shaft 64.

Once the supply roll 60 is positioned on the support shaft 64 using the collet/collar assembly 102, a second collet/collar assembly 140 (FIGS. 5–7) is used to secure the supply roll 60 to the support shaft 64, such that the support shaft 64, attached collet/collar assemblies 102, 140, and the supply roll 60 rotate simultaneously as a single unit. The collet/collar assembly 140 is attached to the support shaft 64 on the side of the supply roll 60 opposite the collet/collar assembly 102. Thus, the supply roll 60 is fixed in position on the supply shaft 64 between the collet/collar assemblies 102, 140.

Figure 5:
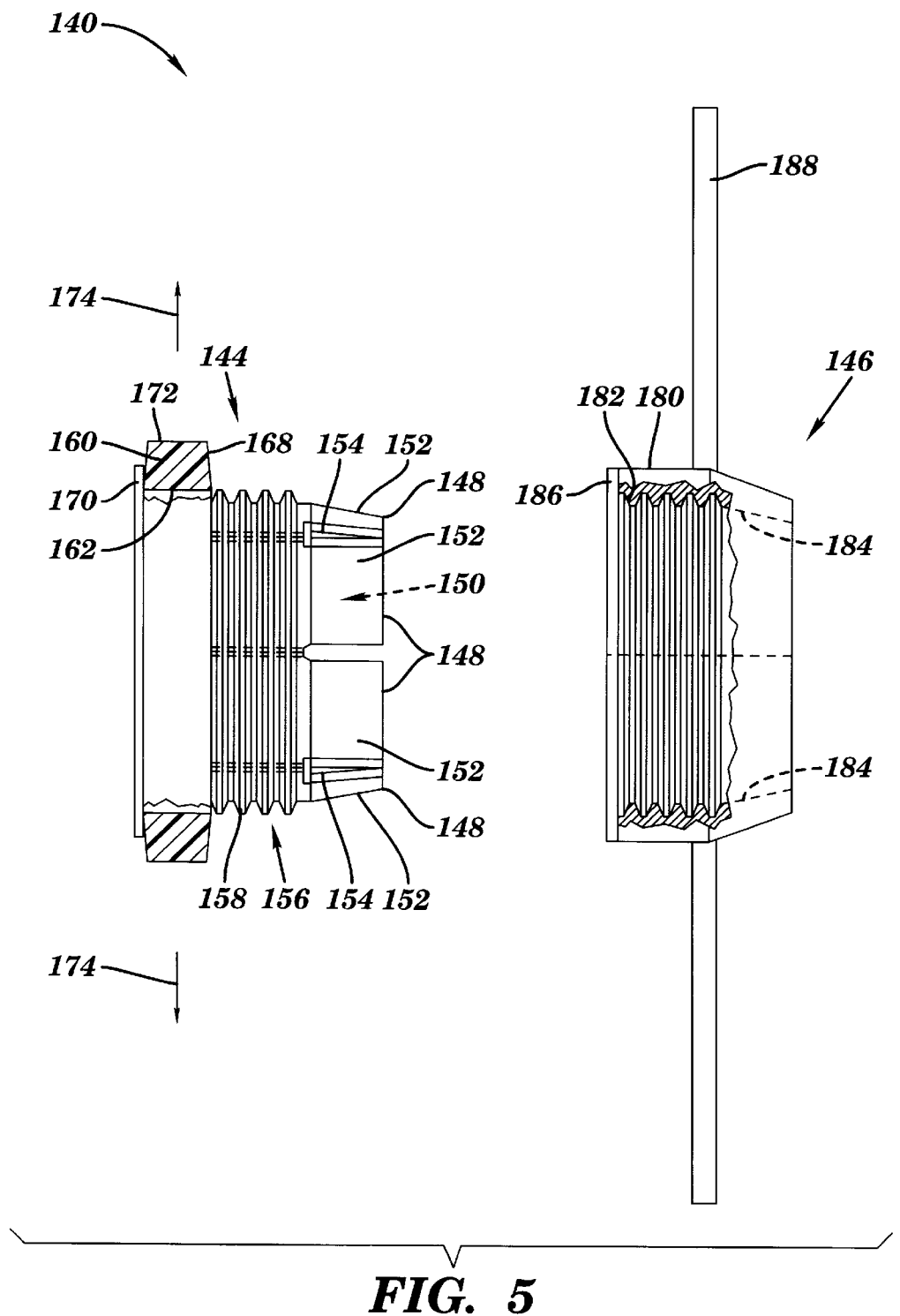
FIG. 5 is an exploded view of a collet/collar assembly for positioning and frictionally coupling the supply roll to the supply shaft.
Figure 6:
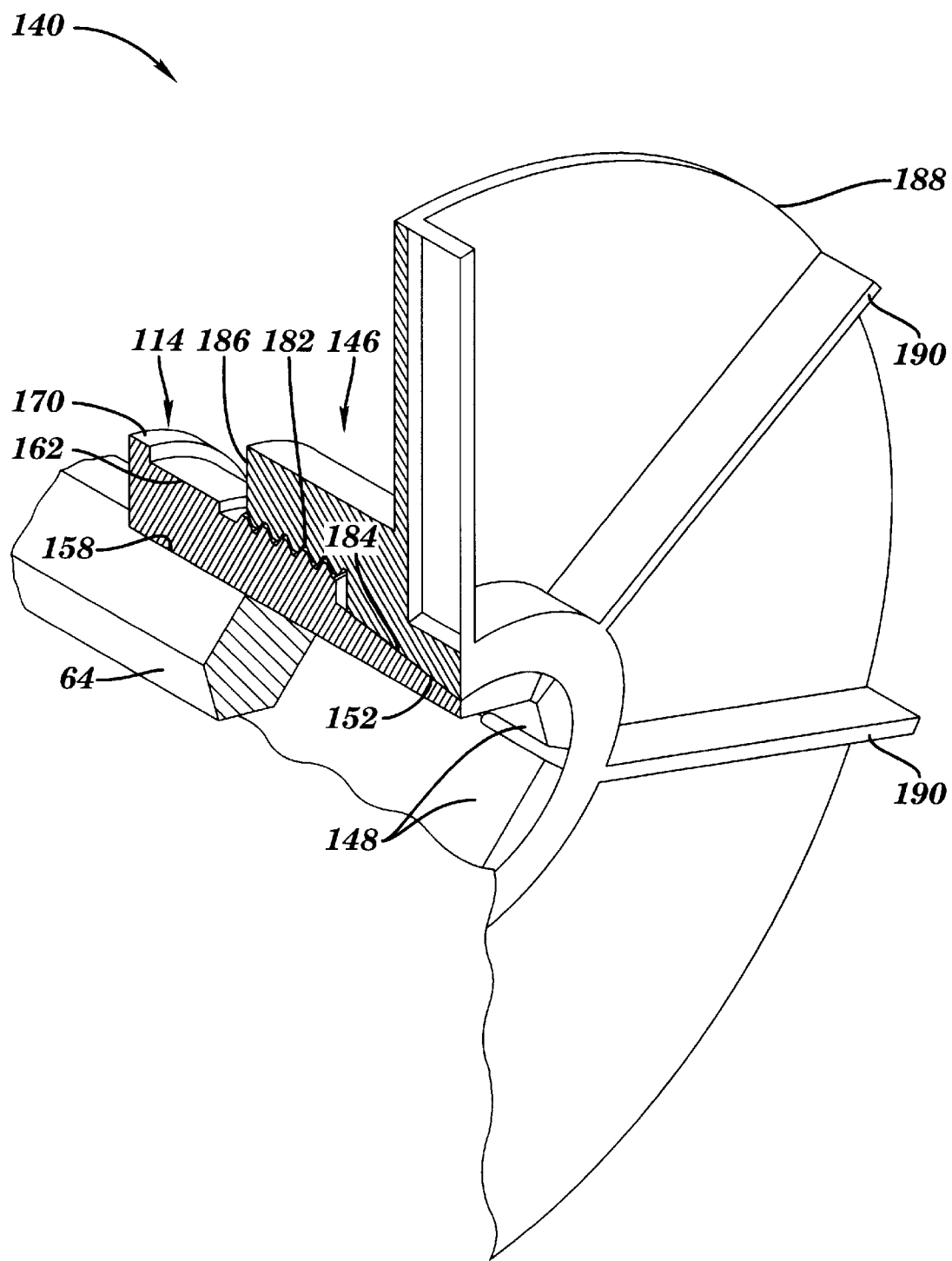
FIG. 6 is a cut-away perspective view of the collet/collar assembly of FIG. 5.
Figure 7:
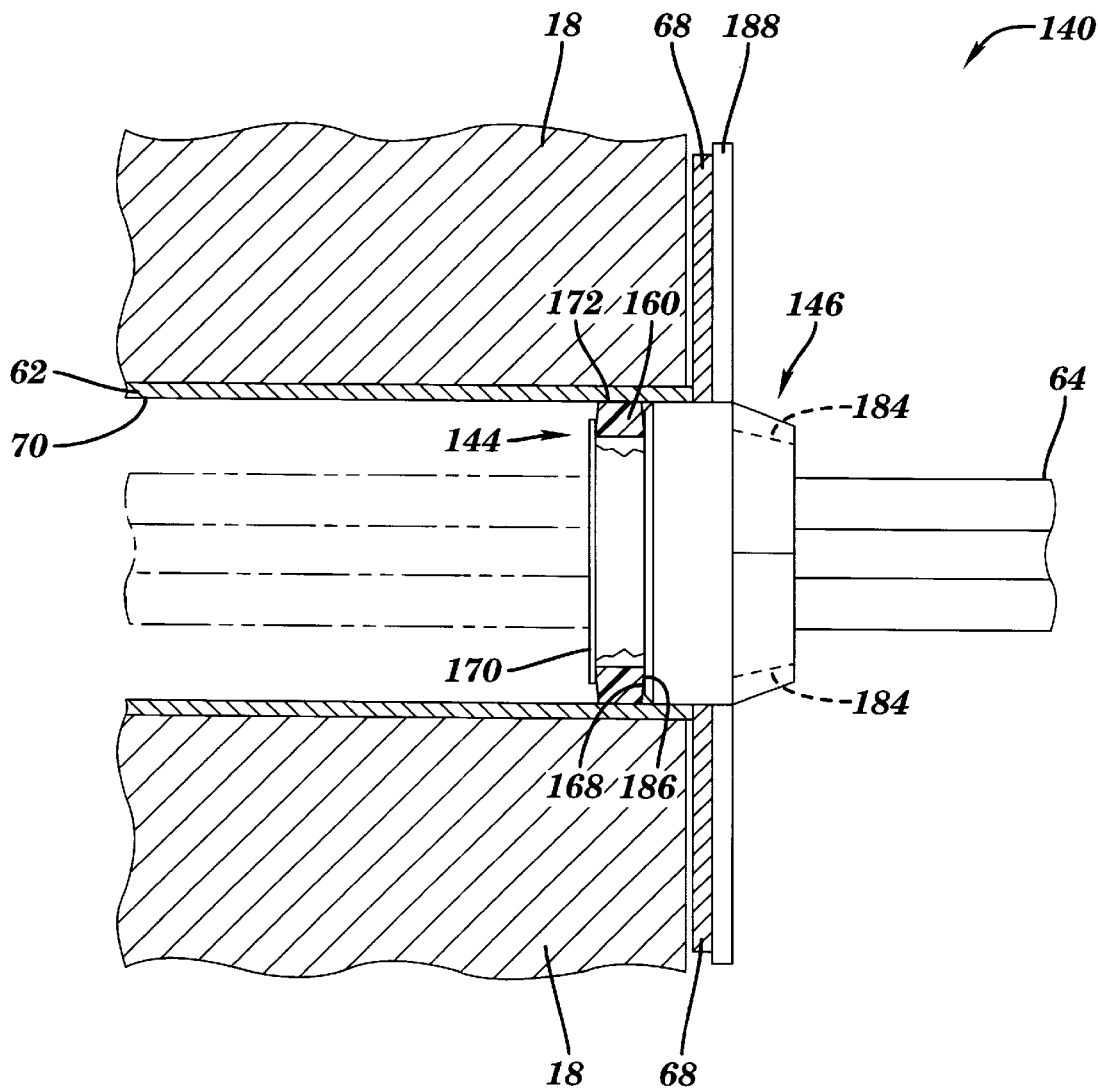
FIG. 7 is an operational view of the collet/collar assembly of FIG. 5.

As shown in FIGS. 5–7, the collet/collar assembly 140 includes a collet 144 and a collar 146. The collet 144 generally has a configuration similar to that of the collet 104 used in the collet/collar assembly 102. Specifically, the collet 144 preferably comprises a plurality of leaf springs 148 (e.g., 6 leaf springs) arranged about a hexagonal bore 150. The hexagonal bore 150 is slightly larger than the hexagonal cross-section of the support shaft 64 (FIG. 3). This allows the collet 144 to be displaced into position along the support shaft 64. Each leaf spring 148 includes a frustroconical outer surface 152 and an inner bearing surface 154.

A portion 156 of the collet 144 adjacent to the leaf springs 148 includes an external thread 158. A gland 160 is mounted around a cylindrical area 162 of the collet 144 adjacent to the external thread 158. The gland 160 is preferably formed of rubber or other elastomeric or deformable material, and has a rounded or chamfered outer surface 172. As presented in greater detail below, the gland 160 is used to provide a high friction interface between the collet/collar assembly 140 and the interior surface 70 of the supply core 62.

The collar 146 comprises a cylindrical portion 180 having an internal thread 182. The internal thread 182 is designed to mate with the external thread 158 formed around the collet 144 in response to a rotation of the collar 146. The collar 146 additionally includes a corresponding frustroconical internal bearing surface 184. When the collar 146 is screwed onto the collet 144, the frustroconical internal bearing surface 184 of the collar 146 contacts the frustroconical outer surfaces 152 of the leaf springs 148 of the collet 144. The contact of the surfaces 152, 184 compresses the inner bearing surface 154 of each leaf spring 148 against the surface of the support shaft 64, thereby securing the collet/collar assembly 140 against the support shaft 64.

As the collar 146 is screwed onto the collet 144, a bearing surface 186 of the collar 146 is forced against a side 168 of the gland 160. The gland 160 is in turn forced against a thrust bearing 170 located adjacent an end of the collet 144. Since the gland 160 is constrained between the bearing surface 186 of the collar 146 and the thrust bearing 170 of the collet 144, the outer surface 172 of the gland 160 is forced outward in the direction indicated by directional arrows 174. When the collet 144 is located within the supply core 62, the compression of the gland 160 caused by the co-action of the bearing surface 186 and the thrust bearing 170 forces the outer surface 172 of the gland 160 against the interior surface 70 of the supply core 62, thereby forming a high friction interface between the collet/collar assembly 140 and the supply core 62.

The collar 146 additionally includes a stop or locator flange 188. The flange 188 may include a plurality of splines 190 (FIG. 6) or a similar structure to facilitate its operation. Upon attachment of the collet/collar assembly 140 to the support shaft 64, the flange 188 is positioned adjacent to an end flange 68 of the supply roll 60. Thus, after attachment of the collet/collar assemblies 102 and 140 to the support shaft 64, the supply roll 60 is fixed in position on the supply shaft 64 between the flanges 126 and 188. Further, a rotation of the support shaft 64 causes a corresponding rotation of the collet/collar assemblies 102 and 140. Since the collet/collar assembly 140 is frictionally coupled to supply roll 60 by the gland 160, any rotation of the collet/collar assembly 140 additionally results in a corresponding rotation of the supply roll 60.

An example of the operation of the mounting apparatus of the present invention can be summarized as follows:

1) Position the collet/collar assembly 102 at a desired location on the support shaft 64;
2) Secure the collet/collar assembly 102 to the support shaft 64 at the desired location by rotating the collar 106 onto the collet 104;
3) Position the supply roll 60 on the supply shaft 64 such that the side (e.g., an end flange 68) of the supply roll 60 abuts the flange 126 of the collar 106;
4) Position the collet/collar assembly 140 adjacent an opposing side of the supply roll 60 with the gland 160 positioned within the supply core 62; and
5) Secure the collet/collar assembly 140 to the support shaft 64 and against the interior surface 70 of the supply core 62 by rotating the collar 146 onto the collet 144. It should be appreciated that the sequence of the above steps may vary, additional steps may be necessary, or one or more of the steps may not be required, depending on the specific application of the mounting apparatus of the present invention. Further, a pair of identical collet/collar assemblies 102 or 140 (instead of one of each) may be used to mount and/or secure a supply roll to a shaft.

Figure 8:
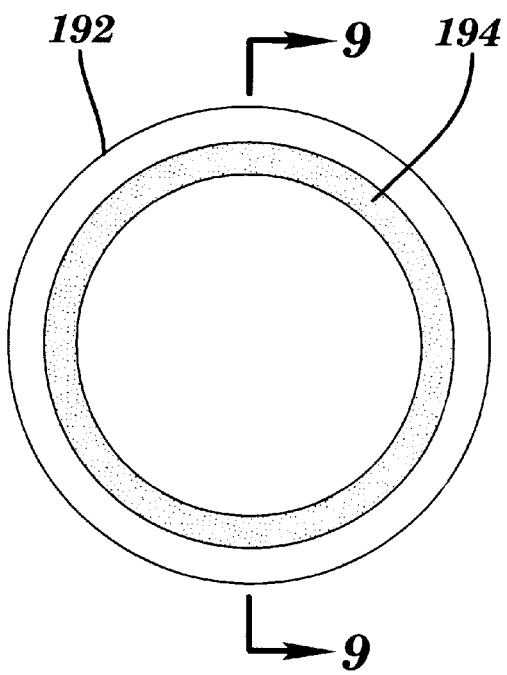
FIGS. 8 and 9 illustrate an alternate embodiment of a gland for frictionally coupling the supply roll to the supply shaft.
Figure 9:
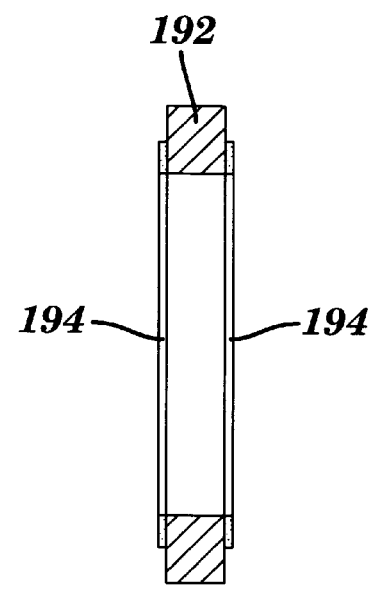

An alternate embodiment of a gland 192 for use in the mounting apparatus of the present invention is illustrated in FIGS. 8 and 9. Unlike gland 160 which has unsupported sides, the gland 192 includes a pair of rigid washers 194 which support the sides of the gland 192. The rigid washers 194 are bonded or otherwise suitably attached to the sides of the gland 192. The outward deformation of the gland 192 as it is compressed between the bearing surface 186 and the thrust bearing 170 of the collet/collar assembly 140 (FIG. 5) can be calculated and controlled using washers 194 having a specific outer diameter. In addition, the use of the washers 194 allows different size glands 192 to be used in conjunction with a given collet/collar assembly 140.

The foregoing description of the present invention has been presented for purposes of illustration and description.

It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

What is claimed is:

1. An apparatus for mounting a supply roll to a rotatable support shaft, comprising:
    a first assembly for positioning a first end of the supply roll at a predetermined location on the support shaft the first assembly including a collet and a collar for compressing the collet against the support shaft; and
    a second assembly for frictionally coupling the support shaft to an interior surface of a supply core of the supply roll, the second assembly including a collet having a deformable gland, and a collar having a surface for compressing the deformable gland against a portion of the collet of the second assembly in response to attachment of the collar to the collet and for causing a surface of the deformable gland to expand in an outward direction against the interior surface of the supply core, wherein the collets further include a plurality of spring members including an inner bearing surface for releasably engaging a surface of the support shaft.

2. The mounting apparatus according to claim 1, wherein the collars further include:
    an internal bearing surface for engaging an outer surface of each spring member upon attachment of the collar to the collet.

3. The mounting apparatus according to claim 1, wherein said collets have a polygonal bore, and wherein the plurality of spring members are arranged about said bore.

4. The mounting apparatus according to claim 2, wherein the collets further include:
    an external thread mateable with an internal thread of the collar upon attachment of the collar to the collet.

5. The mounting apparatus according to claim 1, wherein the collar further includes:
    flange for positioning the first end of the supply roll at the predetermined location on the support shaft.

6. The mounting apparatus according to claim 1, wherein the collets further include:
    an external thread mateable with an internal thread of the collar upon attachment of the collar to the collet.

7. The mounting apparatus according to claim 1, wherein the gland further includes:
    first and second rigid washers attached to opposing sides of the gland.

8. The mounting apparatus according to claim 1, wherein the collars further include:
    a flange for positioning the supply roll on the support shaft.

9. An apparatus for mounting a supply roll having a core with an interior surface, to a rotatable support shaft, comprising:
    an assembly for frictionally coupling a support shaft to an interior surface of a supply roll, the assembly including a collet having a deformable gland, first and second rigid members attached to opposing sides of the deformable gland, and a collar having a surface for compressing the deformable gland against a portion of the collet in response to attachment of the collar to the collet and for causing a surface of the deformable gland to expand outward against the interior surface of the supply roll core in response to attachment of the collar to the collet.

10. The apparatus of claim 9, wherein the first and second rigid members comprise washers.

* * * * *